United States Patent [19]
Lefevre et al.

[11] Patent Number: 5,821,530
[45] Date of Patent: Oct. 13, 1998

[54] COADUNATE EMITTER/DETECTOR FOR USE WITH FIBER OPTIC DEVICES

[75] Inventors: Donald K. Lefevre; Mark V. Anderson; Daniel J. Mulally, all of Rapid City, S. Dak.

[73] Assignee: Wireless Control Systems, Inc, Rapid City, S. Dak.

[21] Appl. No.: 590,692

[22] Filed: Jan. 16, 1996

[51] Int. Cl.$^6$ ............................................. G02B 6/26
[52] U.S. Cl. .................................. 250/227.24; 385/93
[58] Field of Search ............................. 385/92, 93, 94, 385/88; 250/227.24, 227.11

[56] References Cited

U.S. PATENT DOCUMENTS

| | | | |
|---|---|---|---|
| 3,901,607 | 8/1975 | Kingsland | 356/199 |
| 3,996,476 | 12/1976 | Lazzara | 250/563 |
| 4,457,582 | 7/1984 | Lewis et al. | 350/96.2 |
| 4,666,236 | 5/1987 | Mikami et al. | 350/96.15 |
| 5,201,018 | 4/1993 | Coden et al. | 385/88 |
| 5,204,520 | 4/1993 | Green | 250/214.1 |
| 5,247,530 | 9/1993 | Shigeno et al. | 372/36 |

*Primary Examiner*—Edward P. Westin
*Assistant Examiner*—Alan L. Giles
*Attorney, Agent, or Firm*—John R. Duncan; Frank D. Gilliam

[57] ABSTRACT

A coadunate emitter/detector assembly for use with fiber optics. A housing has a socket for receiving an end face of a fiber optic or thin bundle of fiber optics. A detector is mounted in the socket for receiving light from a portion of the end face. An emitter is mounted close to the detector for directing light into another portion of the end face. The detector can respond to changes in the light received, which is generally varied by a device at the opposite end of the fiber optic that reflects more or less of the emitter generated light back to the detector. A condensing lens may be placed between the emitter and the fiber optic end face to maximize emitted light that enters the fiber optic. The emitter and detector may be placed in a single plain with a light barrier between them, may be stacked or may be axially spaced. The emitter may be located in a can with upstanding walls to reduce light scatter.

9 Claims, 1 Drawing Sheet

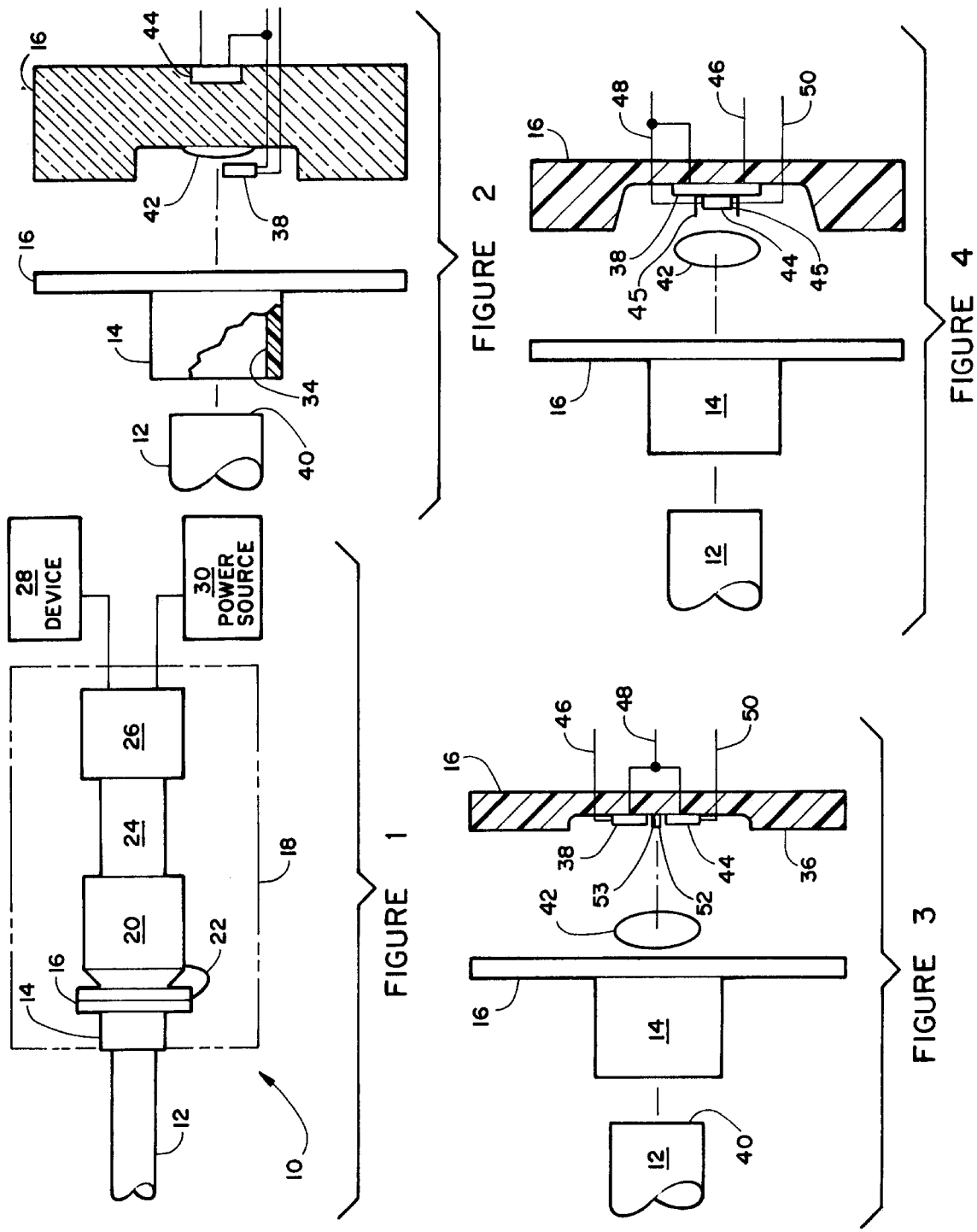

COADUNATE EMITTER/DETECTOR FOR USE WITH FIBER OPTIC DEVICES

BACKGROUND OF THE INVENTION

This invention relates in general to fiberoptic control and communication systems and, more specifically to emitter devices for introducing light signals into a fiberoptic strand and detector devices for receiving light from the fiberoptic strand.

The most typical emitter/detector configuration places an emitter, typically a light emitting diode (LED) at one end of an optical fiber, which may be a single strand or a bundle of strands, and a detector, typically a photodiode, at the other end. The emitter may be modulated in any convenient manner and the resulting varying signal will be detected by the detector and may be used for data transmission, control or other purposes. This is particularly effective in long distance data transmission systems.

In many applications, it is desirable to be able to introduce a light signal into one end of a single fiber optic strand or fiber optic bundle and to detect a signal returned through the fiber optic strand to the same end of the strand. The signal travels in one direction from the emitter, is changed or modulated in any desired manner at the second end and returns to the detector along the same strand. The emitter and detector must be located very close together in line with the fiber optic strand. Or, a complex coupler or beam splitter may be used at the emitter/detector end to separate the emitted and detected signal paths.

In a typical application for a system using an emitter/detector assembly at one end of a fiber optic strand, the detector responds to reflection or absence of reflection of the signal generated by the emitter. A number of different signal modulating arrangements and purposes for such an emitter/detector assembly are described in U.S. Pat. Nos. 5,163,112 and 5,408,550, assigned to the assignee of this application.

A number of different devices have been developed for coupling both an emitter and detector to one end of a fiber optic or fiber optic bundle. Among these are devices using a beam splitter, as shown by Okuda in Japanese Published Application No. 64-285532, Sica in U.S. Pat. No. 4,888,816 and Roberts in U.S. Pat. No. 4,611,884. These systems are relatively large, complex and require careful alignment of multiple components.

An optical fiber having a notched edge and emitter and a detector aligned with the notch is disclosed in European Patent No. 350, 720A. Since the notch only involves a small part of the fiber diameter, this arrangement has inherently low efficiency.

Perino, in U.S. Pat. No. 4,773,722 describes an arrangement in which a collimated beam from an emitter is directed into an end of a fiber optic, with returning light being expanded as it leaves the fiber to a larger detector optical system. This device has a physical size much greater than the fiber optic diameter and requires a carefully aligned optical system.

Thus, there is a continuing need for very compact, simple, low-cost and easily manufactured closely spaced emitter/detector devices having improved optical efficiency for use with thin fiber optic strands made up of a single fiber or fiber bundles.

SUMMARY OF THE INVENTION

The above-noted problems, and others, are overcome by a coadunate emitter/detector assembly basically comprising a housing having a socket on one side for receiving an end face of a fiber optic strand and an assembly of coadunate, very closely spaced, light emitter and detector positioned against or closely spaced from the end face of a fiber optic strand in the socket. The detector is positioned to receive light exiting a first portion of the end face and the emitter is similarly positioned to direct light into a second portion of the end face.

In some cases it is preferred that a small condensing lens be positioned between fiber optic end face and the emitter and/or detector to improve efficiency.

The fiber optic strand may be a single fiber or a small bundle of fibers. For the purposes of this application, "fiber optic strand" will be understood to include both single and multiple fibers. While any suitable fiber optic strand material and diameter may be used, for many applications best results are obtained with a single fiber, jacketed, plastic optic fiber having a diameter of from about 0.25 to 2 mm because the high durability, small bend radius, low cost and elimination of end polishing requirements with such fibers. Typically, a conventional 0.5 mm jacketed optical fiber strand (about 1 mm including jacket) is used for distances up to about 100 feet, with 1 mm jacketed optical fibers (about 2.2 mm including jacket) preferred for distances up to about 400 feet and in situations that require an exceptionally rugged fiber. In high temperature environments and in situations requiring long fiber lengths, single or multi fiber glass fiber optic strands are preferred.

Any suitable emitter and detector may be used. They may be closely located discrete chips or may be fabricated together as a single chip or hybrid chip. Since they are located so close together, they can share one common lead and each have only one independent lead, helping to reduce size and complexity of the assembly. Typical detector types include photodiodes, phototransistors and photodarlingtons. Of these, photo darlingtons are preferred because of their high gain. Typical emitters include light emitting diodes (LED), lasers and incandescent sources. Of these, LED's are preferred because they are compact, have long lifetimes and are inexpensive. The emitter/detector assembly can be selected to operate at infrared, visible and/or ultraviolet light (electromagnetic) wavelengths.

BRIEF DESCRIPTION OF THE DRAWING

Details of the invention, and of preferred embodiments thereof, will be further understood upon reference to the drawing, wherein:

FIG. 1 is a schematic representation of a typical control module using the coadunate emitter/detector assembly;

FIG. 2 is a schematic exploded view of a coadunate emitter/detector assembly;

FIG. 3 is a schematic exploded view of a second embodiment of a coadunate emitter/detector assembly; and FIG. 4 is a schematic exploded view of a third embodiment of a coadunate emitter/detector assembly.

DETAILED DESCRIPTION OF PREFERRED EMBODIMENTS

FIG. 1 schematically illustrates a typical control module 10 which would use the coadunate emitter/detector assembly of this invention.

An optical fiber strand 12 is seated in a socket 14 in housing 16. The emitter/detector assembly is contained in housing 16, contiguous with the end face of strand 12, as detailed below.

An electronics section 20 typically includes an integrated circuit, typically a CMOS or discrete components, for providing power conditioning and required DC levels to the emitter/detector, amplification for signals received through wires 22 from the detector and memory and reset functions to restore the device being controlled to a desired state in the event of power failure.

A switching interface 24 provides an output signal to a power switching section 26 which then controls an electrical device 28 such as a motor, light system, etc. The output of switching interface 24 typically could be such as to switch a triac, power transistor, relay or to provide logic high or low signals.

Power switching section 26 could include any of several devices. Typically this could be a relay to switch either AC or DC power to electrical device 28, a triac to provide solid state switching of AC power to electrical device 28 or a power transistor to provide solid state switching of DC power to electrical device 28. Power, AC and/or DC as required by the intended applications, is supplied by a conventional power source 30, which may be standard power lines or via electrical device 28.

In many applications power switching section 26 would be incorporated into control module 10, as schematically shown, usually on a single compact circuit board. However, for some applications it may be desirable to house the electronics section (integrated circuit 20 and switching interface 24) separately from the power switching section 26. In some cases the electronics section may simply provide a logic signal to the device 28 being controlled.

Details of a first preferred embodiment of the coadunate emitter/detector assembly are provided in the exploded view of FIG. 2. A socket 14 on housing 16 has a cylindrical opening 34 sized to fit the end of fiber optic strand 12. Once inserted into opening 34, strand 12 can be held in place by friction, an adhesive or any conventional mechanical means. While stand 12 is ordinarily simply inserted until it bottoms out against the underlying components, a very small shoulder could be provided around the base of opening 34 to provide a positive stop.

The base portion 36 of housing 16 in this embodiment is formed from a clear plastic and has emitter 44 embedded opposite the end face 40 of strand 12. The thickness of base 36 and distance between lens 42 and emitter 44 is somewhat exaggerated, for clarity of illustration. On the surface of base 36 adjacent to end face 40 are mounted a condensing lens 42 and a detector 38 overlying a selected portion of the lens. Light from emitter 44 passes through the entire area of lens 42 except that portion covered by detector 38 and into end face 40 of strand 12. Light reflected back from the opposite end of fiber optic strand 12 is emitted from end face 40 and detected by detector 38.

If desired, lens 42 could be omitted where passing of less light from the end face 40 to detector 38 is acceptable. Electrical devices are controlled in response to the presence or absence of detected light, by variations in the intensity of detected light, by "on" and "off" patterns of detected light, etc.

Power is provided to emitter 44 through independent wire 46 and common wire 48. The signal from detector 38 passes to the control system via independent wire 50 and common wire 48.

A second embodiment of the coadunate emitter/detector is schematically illustrated in FIG. 3. Here, fiber optic strand 12, housing 16 and socket 14 are basically the same as in FIG. 2. In this embodiment, detector 38 and emitter 44 are closely spaced on base 36, each covering a portion of end face 40.

An opaque divider 52 is provided between detector 38 and emitter 44 to prevent cross talk between them. Divider 52 also serves as a physical stop for the end of optical fiber strand 12 when pushed into a socket 14 that does not have a stop shoulder. Since the end of the optical fiber strand 12 is very narrow, typically about 20 mils, it is important that divider 52 be kept as thin as possible. Divider 52 typically has a thickness of about 0.01 inch and is made from glass having a very thin aluminized layer 53 on one side. For thicker fibers, the divider may simply be made from an opaque material. In addition to preventing cross talk, reflective layer 53 will also reflect light from emitter 44 which strikes that side of the divider into strand 12 and, on the opposite divider side, will reflect light from strand 12 to detector 38, maximizing system efficiency.

FIG. 4 illustrates a third embodiment of the coadunate emitter/detector assembly. Here, fiber optic strand 12, housing 16 and socket 14 are the same as in FIGS. 2 and 3. In this embodiment, emitter 44 is stacked on detector 38. Preferably emitter 44 is centered and covers a suitable area. Emitter 44 is placed in a small "can" with the emitter surrounded by upright walls 45. Walls 45 direct more of the light toward fiber optic 12 with less scattering and avoids any light from emitter 44 directly reaching detector 38. This "emitter in a can" configuration may be used with emitter 44 in each of the other embodiments, if desired.

For optimum performance, a condensing lens 42 is centered over emitter 44, although the lens can be omitted if desired. A common wire 48 and independent wires 46 and 50 connect emitter 44 and detector 38 to integrated circuit 20 of the sort shown in FIG. 1.

While certain specific relationships, materials and other parameters have been detailed in the above description of preferred embodiments, those can be varied, where suitable, with similar results. Other applications, variations and ramifications of the present invention will occur to those skilled in the art upon reading the present disclosure. Those are intended to be included within the scope of this invention as defined in the appended claims.

We claim:

1. A coadunate emitter/detector assembly for use with fiber optics, which comprises:

a housing;

a socket in said housing for receiving an end face of a fiber optic strand and for locating said end face at a predetermined position;

a condensing lens adjacent to said predetermined position;

a detector, located in said housing between said predetermined position and said condensing lens, for receiving light from a first portion of said end face of a fiber optic strand when in said socket;

an emitter, located in said housing with said condensing lens between said emitter and said end face of a fiber optic strand when in said socket, for directing light into a second portion of said end face of a fiber optic strand in said socket.

2. The coadunate emitter/detector assembly according to claim 1, further including a transparent portion of said housing positioned between said condensing lens and said emitter.

3. The coadunate emitter/detector assembly according to claim 1 wherein:

surfaces of said emitter and detector facing towards said socket are substantially in one plane;

said condensing lens is positioned between said end face of a fiber optic strand when a fiber optic strand is in said socket and both of said emitter and said detector; and further including an opaque divider between said emitter and said detector and in contact with said condensing lens.

4. The coadunate emitter/detector assembly according to claim 3, wherein said divider comprises a transparent support having a light reflecting film on one side.

5. The coadunate emitter/detector assembly according to claim 4, wherein said transparent support is formed from glass and said reflecting film is an aluminum film.

6. The coadunate emitter/detector assembly according to claim 1, wherein:

said emitter is stacked on said detector and covers at least part of said detector surface; and said condensing lens is positioned between said stack and said end face of a fiber optic strand when in said socket.

7. The coadunate emitter/detector assembly according to claim 1 wherein said emitter and detector each have one independent electric lead and share one common lead, said leads extending through said housing.

8. The coadunate emitter/detector assembly according to claim 1 wherein said emitter emits and said detector detects electromagnetic radiation at predetermined wavelengths within infrared, visible and ultraviolet wavelengths.

9. The coadunate emitter/detector assembly according to claim 1 wherein said emitter is positioned in a can with upstanding walls surrounding said emitter.

* * * * *